United States Patent
Kim et al.

(10) Patent No.: US 9,684,790 B2
(45) Date of Patent: Jun. 20, 2017

(54) APPLICATION PROCESSING APPARATUS AND METHOD FOR MOBILE TERMINAL

(71) Applicant: Samsung Electronics Co. Ltd., Suwon-si, Gyeonggi-do (KR)

(72) Inventors: Yohwa Kim, Yongin-si (KR); Hyungchul Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 161 days.

(21) Appl. No.: 13/770,575

(22) Filed: Feb. 19, 2013

(65) Prior Publication Data

US 2013/0227263 A1 Aug. 29, 2013

(30) Foreign Application Priority Data

Feb. 24, 2012 (KR) .................. 10-2012-0019305

(51) Int. Cl.
G06F 21/60 (2013.01)
G06F 21/57 (2013.01)

(52) U.S. Cl.
CPC .......... *G06F 21/602* (2013.01); *G06F 21/575* (2013.01)

(58) Field of Classification Search
CPC ....... G06F 9/545; G06F 21/602; G06F 21/575
USPC .............. 713/164, 187, 2; 714/39; 717/171
See application file for complete search history.

(56) References Cited

U.S. PATENT DOCUMENTS

| | | | |
|---|---|---|---|
| 7,373,504 B1* | 5/2008 | Belgaied et al. | 713/164 |
| 2005/0005101 A1* | 1/2005 | Yenduri | G06F 21/57 713/164 |
| 2008/0307215 A1* | 12/2008 | Willems | 713/2 |
| 2011/0022840 A1* | 1/2011 | Stefan et al. | 713/167 |
| 2011/0138146 A1* | 6/2011 | Molnar et al. | 711/170 |
| 2012/0124675 A1* | 5/2012 | Lee et al. | 726/28 |

* cited by examiner

*Primary Examiner* — Izunna Okeke
*Assistant Examiner* — Angela Holmes
(74) *Attorney, Agent, or Firm* — Jefferson IP Law, LLP (57) ABSTRACT

An apparatus and a method for processing an application in a mobile terminal are provided. The method includes loading, by a bootloader upon system booting, a kernel, determining whether the kernel is modified, creating, when the kernel is modified, kernel verification information indicating a custom kernel, encrypting the kernel verification information, and sending the encrypted kernel verification information, activating, by a kernel handler, the kernel, and receiving the kernel verification information from the bootloader, and forwarding the kernel verification information, decrypting, by a rooting detector, the kernel verification information into kernel status information and delivering the kernel status information when a specified Application Programming Interface (API) is invoked, and invoking, by an application handler, the API when an application is executed and controlling an execution of the application when the kernel status information indicating the custom kernel is received.

20 Claims, 6 Drawing Sheets

APPLICATION PROCESSING APPARATUS AND METHOD FOR MOBILE TERMINAL

PRIORITY

This application claims the benefit under 35 U.S.C. §119(a) of a Korean patent application filed on Feb. 24, 2012 in the Korean Intellectual Property Office and assigned Serial No. 10-2012-0019305, the entire disclosure of which is hereby incorporated by reference.

BACKGROUND OF THE INVENTION

1. Field of the Invention

The present invention relates to an application processing apparatus and method for a mobile terminal. More particularly, the present invention relates to an apparatus and method that determine whether to execute an application by checking kernel modification in a mobile terminal.

2. Description of the Related Art

Currently, many mobile terminals employ the Linux kernel, whose source code is released as open-source software, as their Operating System (OS) kernel. The Linux kernel provides core system services related to security, memory management, process management, and networking and device drivers. The Linux kernel resides between hardware and software in abstraction layers.

The Linux kernel is open-source software licensed under the General Public License (GPL). Any licensee who adheres to the terms and conditions of the GPL is allowed to use and modify licensed software. However, this may make it extremely difficult to prevent modification of the Linux kernel itself. Accordingly, network operators or hardware manufacturers may have to pay extra costs to cope with malicious or unwanted modification of core system binaries such as OS kernel binaries. A malicious, or even unintentionally incompatible, modification of the Linux kernel may prevent an application from executing properly.

Accordingly, there is a need for an apparatus and method that determine whether to execute an application by checking kernel modification in a mobile terminal.

SUMMARY OF THE INVENTION

Aspects of the present invention are to address at least the above-mentioned problems and/or disadvantages and to provide at least the advantages described below. Accordingly, an aspect of the present invention has been made in view of the above problems and the present invention provides an apparatus and method that examine whether the OS kernel binary is modified and that notify the examination result to thereby control an application execution in a mobile terminal.

Another aspect of the present invention is to provide an apparatus and method for kernel modification diagnosis in a mobile terminal, wherein the bootloader checks an electronic signature attached to the kernel binary during boot to identify whether the kernel binary is modified, encrypts the checked result to prevent modification, and outputs the encrypted checked result as diagnosis results.

Another aspect of the present invention is further to provide an apparatus and method for application processing in a mobile terminal, wherein diagnosis results from the bootloader are delivered as a modification indication to an associated application, so that the application can be controlled according to the modification indication.

In accordance with an aspect of the present invention, a method for detecting kernel modification in a mobile terminal is provided. The method includes loading a kernel upon system booting, determining whether the kernel is modified by analyzing the kernel and comparing the analysis result with an electronic signature, and creating, when the kernel is modified, kernel verification information indicating a custom kernel, encrypting the kernel verification information, and sending the encrypted kernel verification information to a framework.

In accordance with another aspect of the present invention, a method for application processing in a mobile terminal is provided. The method includes loading, by a bootloader upon system booting, a kernel, determining whether the kernel is modified, creating, when the kernel is modified, kernel verification information indicating a custom kernel, encrypting the kernel verification information, and sending the encrypted kernel verification information, activating, by a kernel handler, the kernel, and receiving the kernel verification information from the bootloader, and forwarding the kernel verification information, decrypting, by a rooting detector, the kernel verification information into kernel status information and delivering the kernel status information when a specified Application Programming Interface (API) is invoked, and invoking, by an application handler, the API when an application is executed and controlling an execution of the application when the kernel status information indicating the custom kernel is received.

In accordance with another aspect of the present invention, an apparatus for application processing in a mobile terminal is provided. The apparatus includes a bootloader for loading, upon system booting, a kernel, for determining whether the kernel is modified, for creating, when the kernel is modified, kernel verification information indicating a custom kernel, for encrypting the kernel verification information, and for sending the encrypted kernel verification information, a kernel handler for activating the kernel, for receiving the kernel verification information from the bootloader, and for forwarding the kernel verification information, a framework, including a rooting detector, for decrypting the kernel verification information into kernel status information, and for delivering the kernel status information when a specified API is invoked, and an application handler for invoking, when an application is executed, the API served by the rooting detector and for controlling an execution of the application when the kernel status information indicating the custom kernel is received.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

The same reference numerals are used to represent the same elements throughout the drawings.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Particular terms (such as "Android OS") may be introduced to describe the invention without limiting the subject matter thereof. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides a mobile terminal employing an open-source kernel as system software with means that can check modification of the kernel binary and notify the checked result to a user application. Specifically, in the mobile terminal, the bootloader checks modification of the kernel binary. Here, the bootloader examines an electronic signature attached to the kernel binary to detect kernel modification, encrypts the examination result to prevent alteration, and provides the encrypted examination result as a kernel modification parameter for kernel booting. During booting, the mobile terminal may decrypt the encrypted kernel modification parameter and notify a user application whether the current kernel is a modified version.

To achieve this, the mobile terminal includes a bootloader to start booting and a rooting detection entity to notify of kernel modification. In the boot process, the bootloader, the kernel, and the Android framework are booted in sequence. An application may be activated after initialization of the Android framework. Here, the bootloader determines whether the kernel binary is modified, encrypts the result, and provides the encrypted result as a kernel modification parameter for kernel booting. After the kernel and the Android framework are initialized, the rooting detection entity is activated. The rooting detection entity decrypts the encrypted kernel modification parameter and provides the decrypted kernel modification parameter to a user application to notify of kernel modification.

Next, a description is given of operations according to an exemplary embodiment of the present invention.

Figure 1:
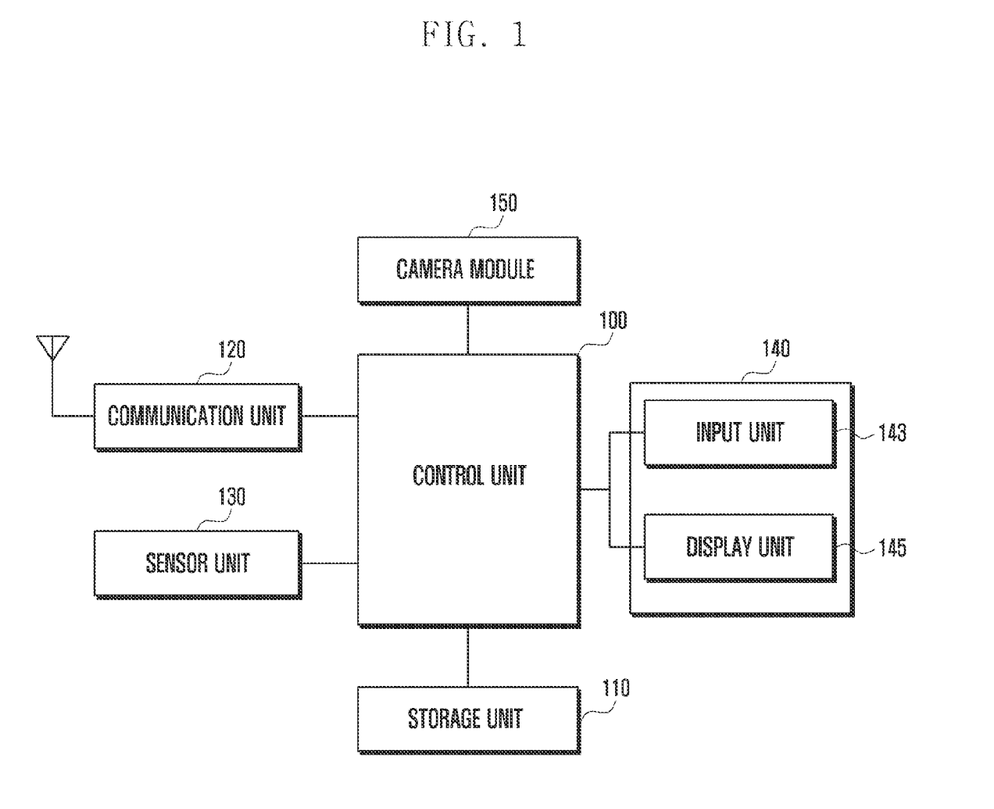
FIG. 1 is a block diagram of a mobile terminal capable of executing various applications according to an exemplary embodiment of the present invention.

FIG. 1 is a block diagram of a mobile terminal capable of executing various applications according to an exemplary embodiment of the present invention. Here, the mobile terminal may be a cellular phone such as a smartphone, and may employ open-source software such as Android as the operating system.

In the mobile terminal of FIG. 1, a communication unit 120 performs wireless communication with a base station or another device. The communication unit 120 may include a transmitter (not shown) for upconverting the frequency of a signal to be transmitted and amplifying the signal, and a receiver (not shown) for low-noise amplifying a received signal and downconverting the frequency of the received signal. The communication unit 120 may further include a modulator/demodulator (not shown), which modulates a signal to be transmitted and forwards the modulated signal to the transmitter, and demodulates a signal received through the receiver. Here, modulation and demodulation may be conducted according to Long Term Evolution (LTE), Wideband Code Division Multiple Access (WCDMA), Global System for Mobile communications (GSM), Wi-Fi, Wireless Broadband (WiBro), Near Field Communication (NFC), or Bluetooth. In one exemplary embodiment of the present invention, the communication unit 120 may include communication modules for LTE, WIFI, Bluetooth, and NFC.

A control unit 100 controls the overall operation of the mobile terminal. In particular, the control unit 100 may include a bootloader 210 (FIG. 2) to check kernel modification during booting and a rooting detector (FIG. 3) to notify of kernel modification. Here, the bootloader examines an electronic signature attached to the kernel binary to detect kernel modification, encrypts the examination result to prevent alteration, and provides the encrypted examination result to the rooting detector as a kernel modification parameter for kernel booting. During booting, the rooting detector decrypts the encrypted kernel modification parameter, and notifies a user application calling a specified Application Programming Interface (API) of kernel modification. Thereby, an execution of the user application can be controlled.

A storage unit 110 includes computer memory that may include a program section (not shown) to store programs for operating the mobile terminal and implementing functions of the present invention, and a data section (not shown) to store data used for operation of the mobile terminal and data generated in the course of using the mobile terminal.

A sensor unit 130 includes various sensors to sense motion, location, ambient light, and the like of the mobile terminal. That is, the sensor unit 130 may include sensors such as an acceleration sensor, a geomagnetic sensor, a Global Positioning System (GPS) receiver, an ambient light sensor, and the like.

An input unit 143 may be implemented by a touch panel that senses a touch gesture of the user. A display unit 145 may be a Liquid Crystal Display (LCD) or Organic Light Emitting Diode (OLED) panel that displays data and images generated during program execution. Here, the input unit 143 and the display unit 145 may be combined to form a touchscreen 140. A camera module 150 may capture an image of a target object under control of the control unit 100.

In the mobile terminal having the above configuration, the firmware may be structured as layers shown in Table 1.

TABLE 1 application
framework
Kernel
bootloader

In Table 1, the application layer may be composed of various applications related to the home screen, contacts, phone calls, browser, etc. The framework may be composed of managers for building various applications (such as an activity manager, a window manager, a content manager, a package manager, a telephony manager, a location manager, and a notification manager), a content provider, and a view system. The kernel provides core system services related to security, memory management, process management, network stacks, and driver models, and may be the Linux kernel in a binary form. The bootloader loads the kernel before the Operating System (OS) starts.

In the structure shown in Table 1, the application, framework and kernel are open source, and the bootloader is not open source but rather is specific to the manufacturer. The open-source OS, particularly the kernel, may be modified by a third party. That is, open-source parts except for the bootloader may be freely modified by a third party under the General Public License (GPL). In particular, the kernel may be modified with malicious intent. Similarly, the kernel may be modified in ways that unintentionally interfere with normal operation. Use of a modified kernel may cause fatal damage to a mobile terminal.

The kernel may be paired with an electronic signature as shown in Table 2.

TABLE 2

| kernel | signature |
|---|---|

Here, the kernel may be a size of about 8 MB, and the signature may be 256 bytes long. When the kernel is the original one created by the manufacturer, it has a matching signature. When the kernel is modified, it may not have a signature, or may have a copied signature. In the following description, a kernel created by the manufacturer is referred to as an official kernel, and a modified kernel is referred to as a custom kernel.

The present invention relates to an apparatus and method that diagnose modification of the kernel binary and that deliver the diagnosis result to an application.

Figure 2:
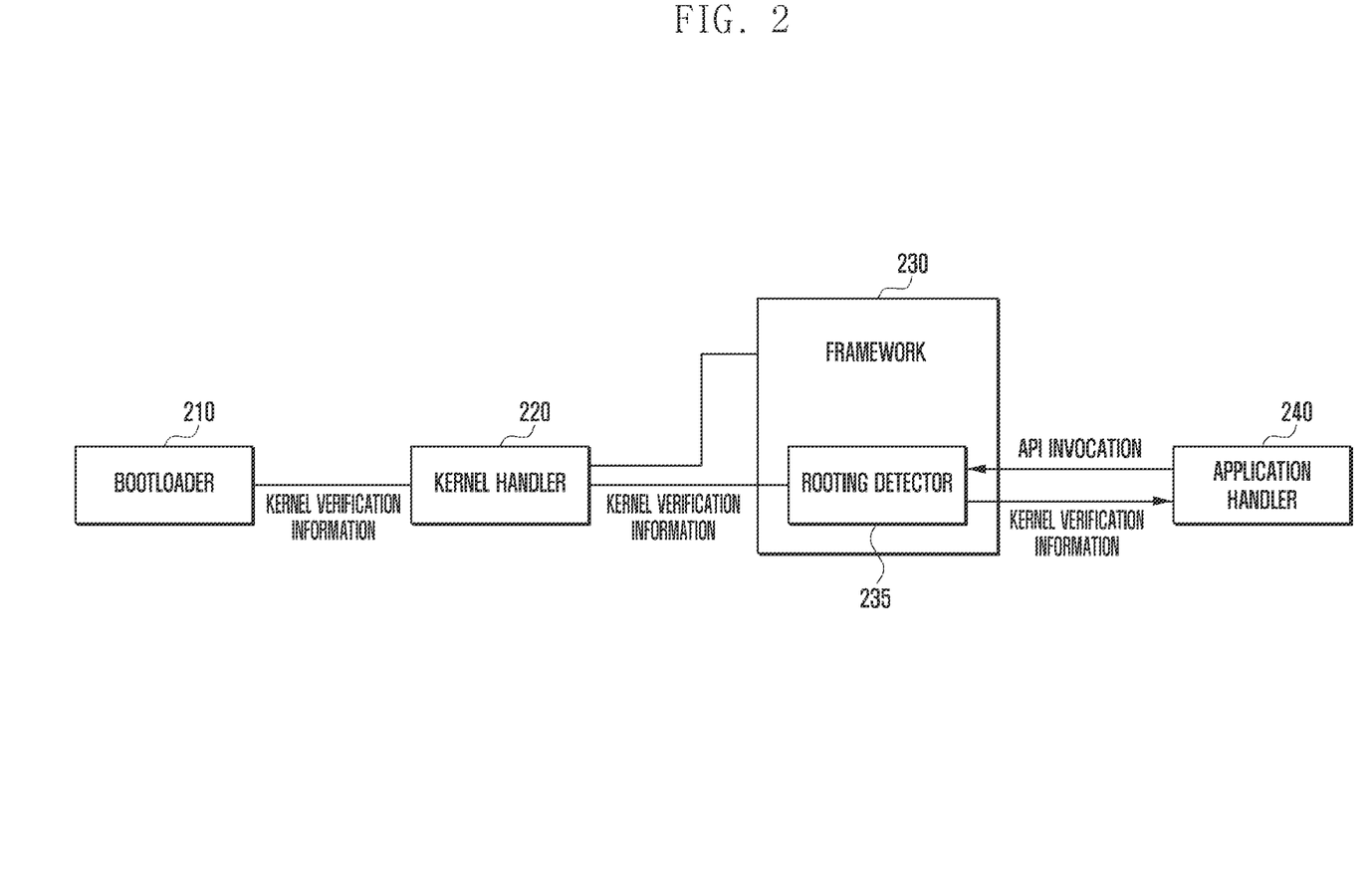
FIG. 2 is a block diagram of an apparatus for diagnosing kernel modification and delivering a diagnosis result in a mobile terminal according to an exemplary embodiment of the present invention.
Figure 3:
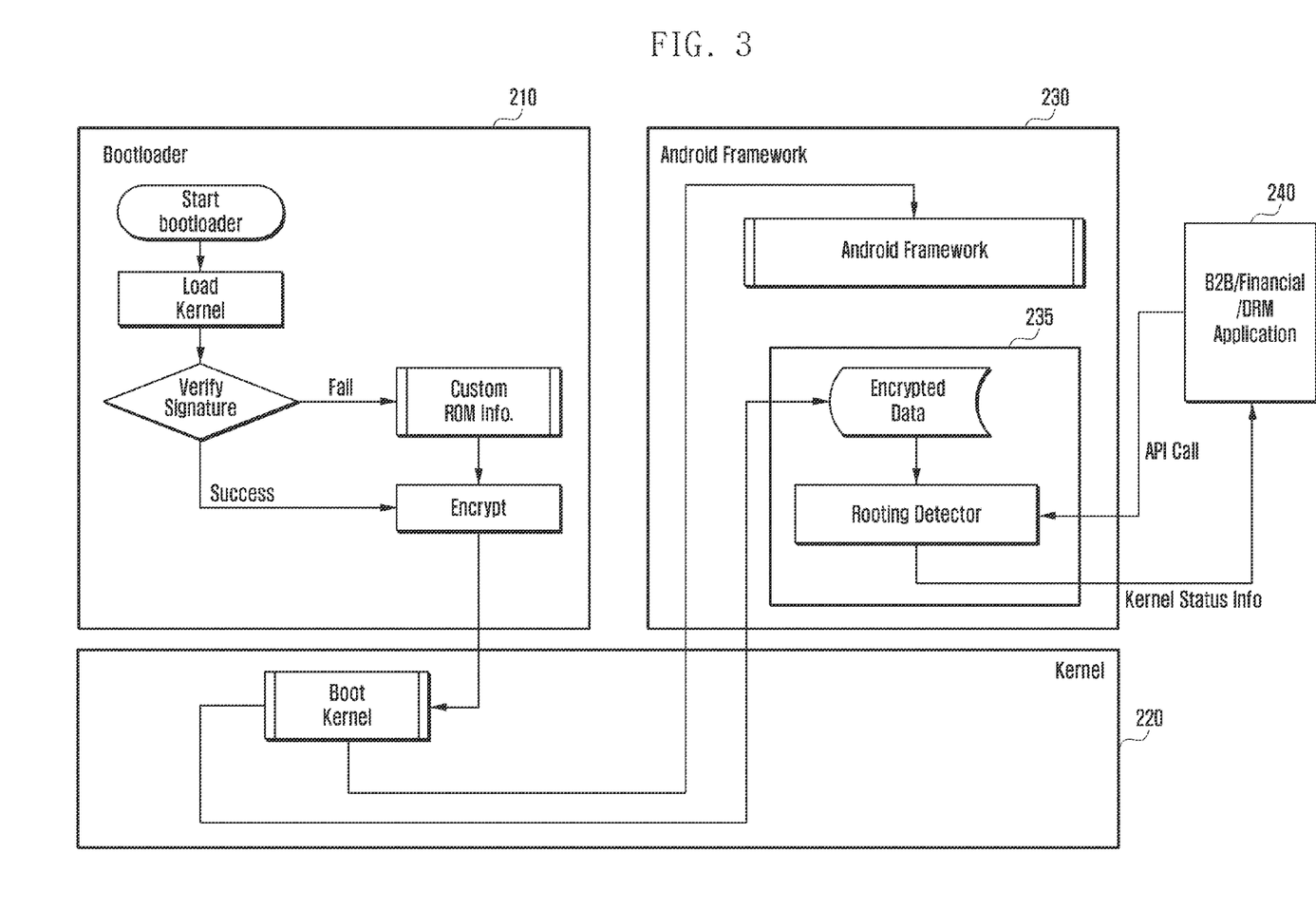
FIG. 3 illustrates operations of components in an apparatus such as, for example, the apparatus of FIG. 2 according to an exemplary embodiment of the present invention.

FIG. 2 is a block diagram of an apparatus for diagnosing kernel modification and for delivering a diagnosis result in the mobile terminal according to an exemplary embodiment of the present invention. FIG. 3 illustrates operations of components in an apparatus, for example, the apparatus of FIG. 2 according to an exemplary embodiment of the present invention. FIGS. 2 and 3 may be associated with internal components of the control unit 100 of the mobile terminal in FIG. 1.

Referring to FIGS. 2 and 3, a bootloader 210 checks kernel modification during booting and encrypts the checked result as kernel verification information. A kernel handler 220 loads the kernel and forwards the kernel verification information from the bootloader 210 to the next stage. A framework 230 receives the kernel verification information from the kernel handler 220. The framework 230 may be the Android framework, and includes a rooting detector 235. The rooting detector 235 decrypts the kernel verification information received from the kernel handler 220 and delivers the decrypted kernel verification information as kernel status information to an application (not shown) invoking a specified API (namely, provides a rooting detection service). An application handler 240 invokes the API on behalf of an application and controls an execution of the application according to the kernel status information.

In the boot process, the control unit 100 loads the bootloader 210 in the working memory (such as Dynamic Random Access Memory (DRAM)) first, the bootloader 210 loads the kernel in the working memory, and the kernel handler 220 loads the framework 230 in the working memory. In exemplary embodiments of the present invention, the bootloader 210, which is not open source software but is instead determined by the manufacturer, diagnoses whether the kernel is modified using a verification algorithm. As indicated by Table 2, the kernel may be paired with an electronic signature. As described before, the open-source kernel may be modified by a third party. In particular, the kernel may be modified with malicious intent. Similarly, the kernel may be modified in ways that unintentionally interfere with normal operation. In the event that the kernel is a modified one (i.e., a custom kernel), the kernel may not have a signature or may have a copied signature. To detect kernel modification, the bootloader 210 may produce a bit string from the kernel binary using a given algorithm and compare the bit string with the electronic signature. That is, the bootloader 210 examines whether the attached signature is created based on the kernel to detect kernel modification.

When the bit string matches the electronic signature, the bootloader 210 determines that the kernel is an official kernel and encrypts the kernel verification result indicating an official kernel. When the bit string does not match the electronic signature, the bootloader 210 determines that the kernel is a custom kernel and encrypts the kernel verification information indicating a custom kernel. Here, the kernel verification information indicating a custom kernel may include a kernel modification count (e.g., a number of kernel modifications). The kernel modification count may be incremented for each downloading of the kernel. The bootloader 210 may perform kernel verification for each system booting upon power on and for each downloading of the kernel. Hence, the kernel modification count may reflect the number of kernel download attempts made by the user. The bootloader 210 may encrypt the kernel verification information using a private key. The private key may be generated using attribute information specific to the mobile terminal. Consequently, different mobile terminals may generate different private keys, and have different encrypted data accordingly.

The encrypted kernel verification information is sent to the kernel handler 220, which loads the kernel and forwards the kernel verification information to the framework 230. The rooting detector 235 of the framework 230 decrypts the kernel verification information and generates kernel status information using the decrypted kernel verification information, and delivers the kernel status information to the application handler 240 when the application handler 240 invokes a corresponding API. The application handler 240 controls an execution of an application according to the kernel status information. For example, assume that the kernel status information indicates kernel modification. The application handler 240 may then determine that it is not appropriate to begin or continue an execution of the application or of certain functions of the application. In the case of a banking application, the application handler 240 may discontinue banking services such as fund transfer. In the case of a Digital Rights Management (DRM) application, the application handler 240 may discontinue playback. In the case of a corporate mail application, the application handler 240 may disallow opening of received mail.

Figure 4:
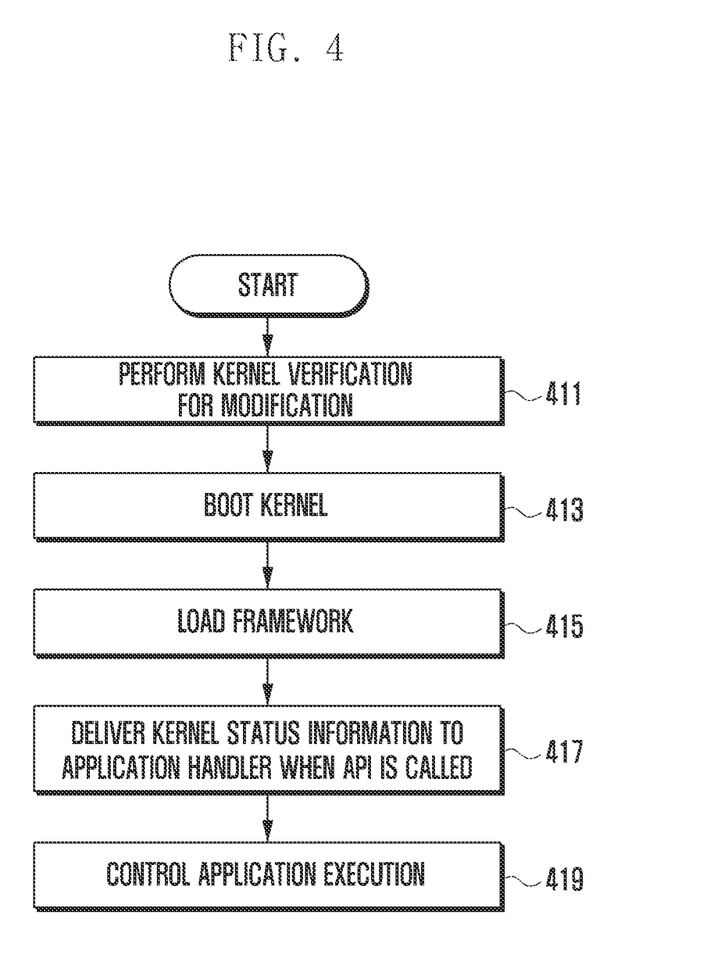
FIG. 4 is a flowchart of a procedure for checking a kernel modification and for handling an application according to another exemplary embodiment of the present invention.

FIG. 4 is a flowchart of a procedure for checking a kernel modification and handling an application according to an exemplary embodiment of the present invention.

Referring to FIG. 4, upon system booting, the bootloader 210 loads the kernel, performs kernel verification for modification, and encrypts the verification result to create kernel verification information in step 411. The kernel handler 220 activates the kernel (i.e., boots up) in step 413, loads the framework 230 in step 415, and forwards the kernel verification information to the framework 230. The framework 230 decrypts the kernel verification information and generates kernel status information using the decrypted kernel verification information, and delivers the kernel status information to the application handler 240 when the application handler 240 invokes a corresponding API in step 417. The application handler 240 controls an execution of an application according to the kernel status information in step 419.

Figure 5:
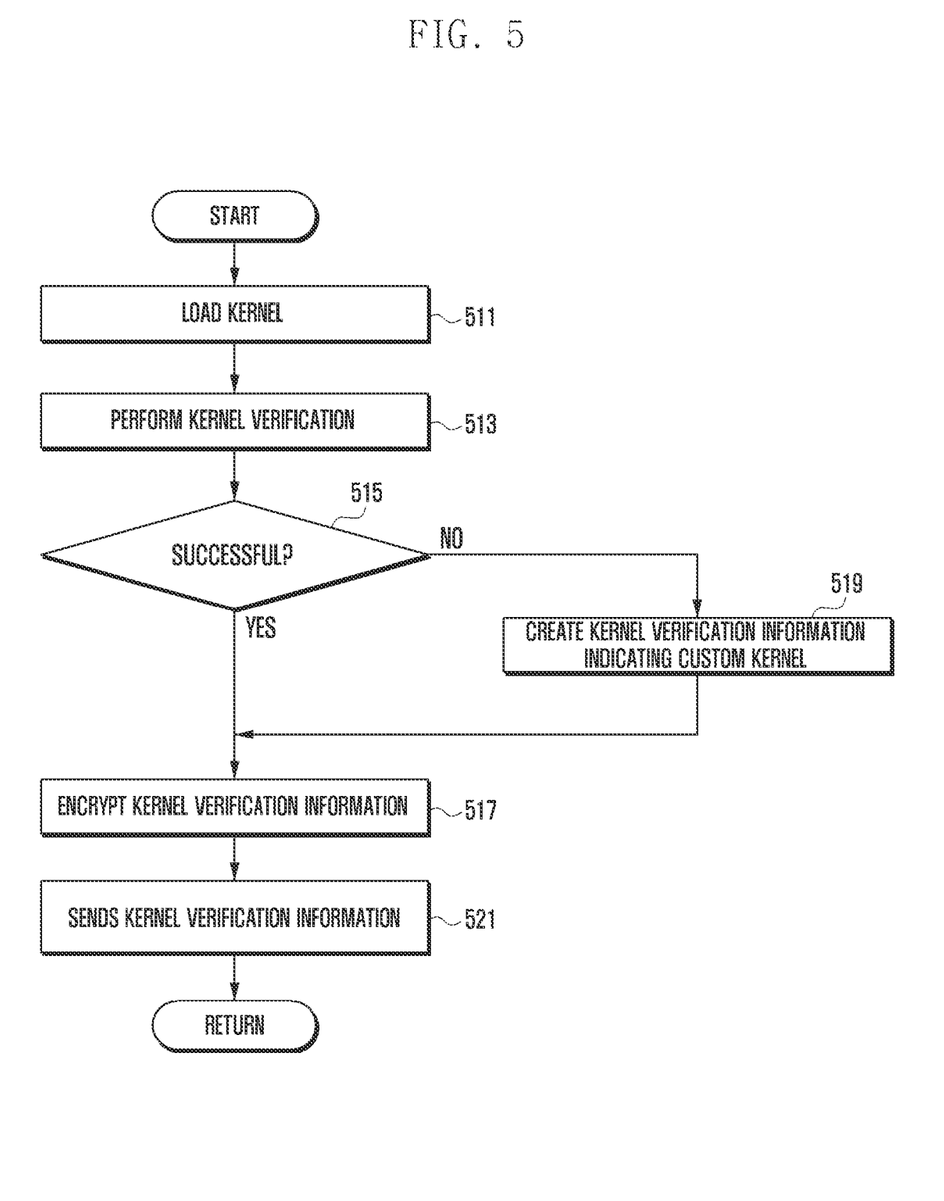
FIG. 5 is a flowchart of a step for checking a kernel modification in a procedure such as, for example the step of FIG. 4 according to an exemplary embodiment of the present invention.

FIG. 5 is a flowchart of a step for checking a kernel modification in a procedure, for example, the step 411 of FIG. 4, according to an exemplary embodiment of the present invention.

Referring to FIG. 5, the bootloader 210 loads the kernel in the working memory upon system booting in step 511. Here, system booting may be caused by power on reset, system restart, or system start after kernel download. The bootloader 210 performs kernel verification in step 513. As indicated by Table 2, the kernel may be paired with an electronic signature. Here, the electronic signature is generated based on the kernel when the kernel is created by the manufacturer. The electronic signature may be generated using a hash function and an official key, and is used to detect kernel modification. When the kernel is modified, it may not have a signature or may have a copied signature. To verify the electronic signature, the bootloader 210 produces a bit string from the kernel binary using a given algorithm and compares the bit string with the electronic signature.

The bootloader 210 determines whether the electronic signature is valid in step 515. When the electronic signature is not valid, the bootloader 210 creates kernel verification information indicating a custom kernel (custom Read Only Memory (ROM) information) in step 519. That is, the custom ROM information indicates that the kernel binary has been modified by someone other than the manufacturer. Here, the kernel verification information indicating a custom kernel may include a kernel modification count (the number of kernel downloads). When the kernel has been modified by someone other than the manufacturer, the bootloader 210 encrypts the kernel verification information indicating a custom kernel in step 517. When the electronic signature is valid, the bootloader 210 creates kernel verification information indicating an official kernel, and encrypts the kernel verification information in step 517. The bootloader 210 encrypts the kernel verification information using a private key that is based on attribute information specific to the mobile terminal. The bootloader 210 sends the encrypted kernel verification information to the kernel handler 220 in step 521. Thereafter, the kernel handler 220 forwards the kernel verification information to the framework 230.

Figure 6:
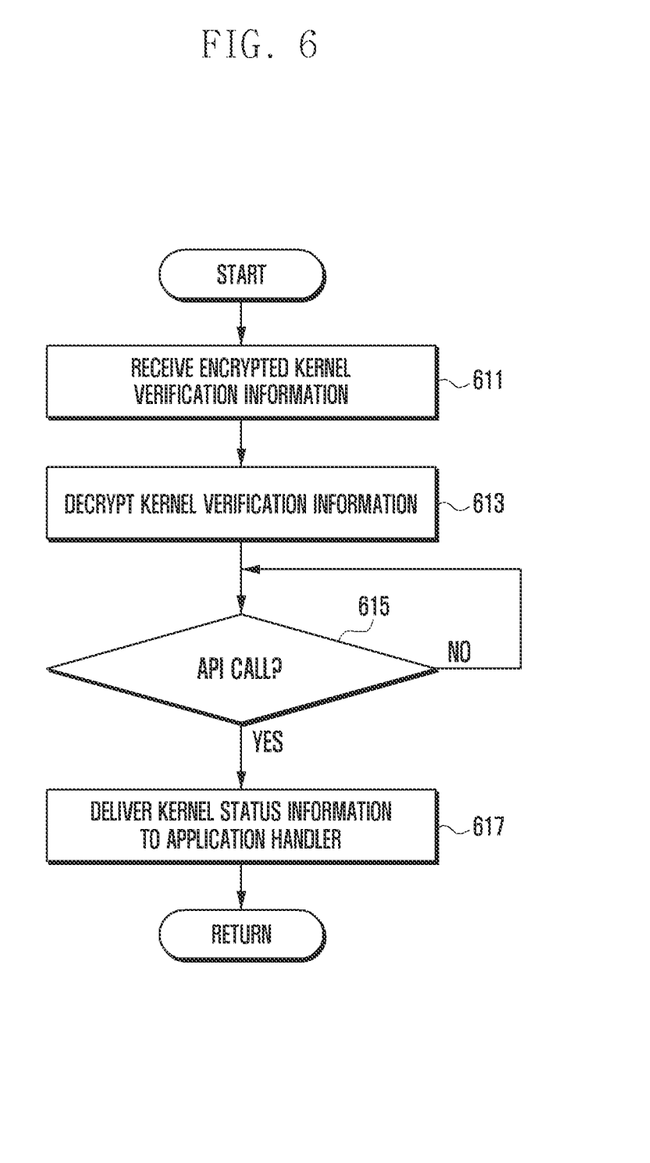
FIG. 6 is a flowchart of a procedure for receiving kernel verification information from a bootloader and forwarding the same to an invoked application according to an exemplary embodiment of the present invention.

FIG. 6 is a flowchart of a procedure for receiving kernel verification information from a bootloader and forwarding the same to an invoked application according to an exemplary embodiment of the present invention.

Referring to FIG. 6, the rooting detector 235 of the framework 230 receives kernel verification information from the bootloader 210 in step 611. The rooting detector 235 decrypts the kernel verification information and generates kernel status information using the decrypted kernel verification information in step 613. Decryption of the kernel verification information may be conducted using the private key used for encryption. The rooting detector 235 determines whether a corresponding API is invoked by the application handler 240 in step 615. When the corresponding API is invoked, the rooting detector 235 delivers the kernel status information to the application handler 240 in step 617. Thereafter, the application handler 240 controls an execution of an application according to the kernel status information. When the kernel status information indicates kernel modification, the application handler 240 may prevent an execution of the application.

In a feature of the present invention, a mobile terminal may diagnose whether the OS kernel is modified and notify an application of the diagnosis result. Hence, a product network service group or network service group may obtain information needed to determine user's mistake during diagnosis of serious problems in a mobile terminal. In addition, applications such as a Business-to-Business (B2B) or financial application may obtain information needed to determine whether the current mobile terminal is modified. An application handler may then determine whether it is safe for an application or an application function to execute with that kernel.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for detecting kernel image modification in a mobile terminal, the method comprising:
   determining, by a bootloader, whether an electronic signature is valid in response to loading a kernel image, the electronic signature being created based on the kernel image; and
   if the electronic signature is not valid,
      creating, by the bootloader, kernel verification information indicating that the kernel image is modified, encrypting the kernel verification information, and sending the encrypted kernel verification information to a framework.

2. The method of claim 1, wherein the determining of whether the electronic signature is valid comprises analyzing the kernel image and determining, if the result of the analyzing does not match the electronic signature, that the kernel image is modified.

3. The method of claim 1, wherein the kernel verification information indicating that the kernel image is modified includes a number of kernel image downloads as a kernel image modification count.

4. The method of claim 1, further comprising:
   creating, if the electronic signature is valid, kernel verification information indicating that the kernel image is not modified.

5. The method of claim 1, wherein the kernel verification information is encrypted using a private key of the mobile terminal and the private key is generated using attribute information specific to the mobile terminal.

6. An apparatus for application processing in a mobile terminal, the apparatus comprising:
an electronic storage comprising a bootloader configured to:
determine whether an electronic signature is valid in response to loading a kernel image, the electronic signature being created based on the kernel image, and
if the electronic signature is not valid,
create kernel verification information indicating that the kernel image is modified,
encrypt the kernel verification information, and
send the encrypted kernel verification information to a framework.

7. The apparatus of claim 6, wherein the bootloader is configured to analyze the kernel image and to determine, if a result of the analysis does not match the electronic signature, that the kernel image is modified.

8. The apparatus of claim 6, wherein the bootloader is configured to create, if the electronic signature is valid, kernel verification information indicating that the kernel image is not modified.

9. The apparatus of claim 6, wherein the kernel verification information indicating that the kernel image is modified includes a number of kernel image downloads as a kernel image modification count.

10. The apparatus of claim 6, wherein the kernel verification information is encrypted using a private key of the mobile terminal, and
wherein the private key is generated using attribute information specific to the mobile terminal.

11. A method for application processing in a mobile terminal, the method comprising:
receiving, by a rooting detector, a kernel verification information indicating validity of an electronic signature, from a bootloader, the electronic signature being created based on a kernel image;
in response to an input for execution of an application, determining, by an application handler, whether the electronic signature is valid based on the kernel verification information; and
if the electronic signature is valid, executing, by the application handler, the application.

12. The method of claim 11, further comprising:
decrypting, by the rooting detector, the kernel verification information,
wherein the received kernel verification information is encrypted.

13. The method of claim 11, further comprising:
in response to the input for execution of the application, invoking, by the application handler, an Application Programming Interface (API).

14. The method of claim 13, further comprising:
in response to the API being invoked, delivering, by the rooting detector, the kernel verification information to the application handler.

15. The method of claim 11, further comprising:
if the electronic signature is not valid, preventing, by the application handler, further execution of the application.

16. An apparatus for application processing in a mobile terminal, the apparatus comprising:
an electronic storage including:
a framework, including a rooting detector, configured to:
receive kernel verification information indicating validity of an electronic signature from a bootloader, the electronic signature being created based on a kernel image, and
an application handler configured to:
determine, in response to an input for execution of an application, whether the electronic signature is valid based on the kernel verification information, and
execute, if the electronic signature is valid, the application.

17. The apparatus of claim 16, wherein the kernel verification information is encrypted, and
wherein the framework is configured to decrypt the kernel verification information.

18. The apparatus of claim 16, wherein the application handler is configured to invoke, in response to the input for execution of the application, an Application Programming Interface (API).

19. The apparatus of claim 18, wherein the framework is configured to deliver, in response to the API being invoked, the kernel verification information to the application handler.

20. The apparatus of claim 16, wherein the application handler is configured to prevent, if the electronic signature is not valid, further execution of the application.

* * * * *